United States Patent
Yoshihara et al.

(10) Patent No.: US 7,315,291 B2
(45) Date of Patent: Jan. 1, 2008

(54) VEHICLE-MOUNTED APPARATUS AND METHOD OF CONTROLLING THE SAME

(75) Inventors: Keiichiro Yoshihara, Tokyo (JP); Katsuomi Koyata, Tokyo (JP); Shigeru Tsuda, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 375 days.

(21) Appl. No.: 10/687,582

(22) Filed: Oct. 20, 2003

(65) Prior Publication Data
US 2004/0061662 A1  Apr. 1, 2004

Related U.S. Application Data

(63) Continuation of application No. 09/690,455, filed on Oct. 18, 2000, now Pat. No. 6,956,540.

(30) Foreign Application Priority Data
Oct. 18, 1999  (JP)  ............... P. 11-295684

(51) Int. Cl.
*G09G 5/00*  (2006.01)
(52) U.S. Cl. ............... 345/1.1; 345/1.3; 345/5; 455/550.1; 455/575.1; 455/575.4; 455/575.5
(58) Field of Classification Search ............... 345/1.1, 345/1.3, 5; 455/550.1, 575.1, 575.4, 575.5
See application file for complete search history.

(56) References Cited

U.S. PATENT DOCUMENTS

| | | |
|---|---|---|
| 4,757,388 A | 7/1988 | Someya et al. |
| 5,075,686 A | 12/1991 | Shigemura |
| 5,121,112 A | 6/1992 | Nakadozono |
| 5,584,054 A | 12/1996 | Tyneski et al. |
| 5,659,361 A | 8/1997 | Jin |
| 5,665,438 A * | 9/1997 | Lee et al. ............... 428/31 |
| 5,710,600 A | 1/1998 | Ishii et al. |
| 5,859,594 A | 1/1999 | King et al. |

(Continued)

FOREIGN PATENT DOCUMENTS

| | | | |
|---|---|---|---|
| JP | 07-160203 | * | 6/1995 |
| JP | 09-280873 | | 10/1997 |

*Primary Examiner*—Richard Hjerpe
*Assistant Examiner*—Leonid Shapiro
(74) *Attorney, Agent, or Firm*—McGinn IP Law Group, PLLC (57) ABSTRACT

By opening and closing the sub display with respect to the main display D1 via a hinge H mounted on the side portion, a variety of uses, such as to display different information on the two different displays, are easily realized, whereby easily supporting diversification of displayed information expected in the future and improvement of the functions. The sub display can be rotated upside down in addition to the horizontal open/close movement with respect to the main display D1, thereby increasing the possible states of use. When the sub display is rotated upside down by 180°, each button B and the markings marked thereon rotates and inverted as well, the marking is shown in the normal orientation, but not inverted orientation as a consequent, thereby facilitating identification and operation of each button. The state of currently selected/connected source is displayed on one of the main display D1 and the sub display.

9 Claims, 9 Drawing Sheets

U.S. PATENT DOCUMENTS

| | | |
|---|---|---|
| 5,905,914 A | 5/1999 | Sakai et al. |
| 5,982,429 A | 11/1999 | Kamamoto et al. |
| 6,067,078 A | 5/2000 | Hartman |
| 6,069,648 A | 5/2000 | Suso et al. |
| 6,072,476 A | 6/2000 | Harada et al. |
| 6,144,296 A * | 11/2000 | Ishida et al. ............. 340/461 |
| 6,144,358 A | 11/2000 | Narayanaswamy et al. |
| 6,224,222 B1 | 5/2001 | Inoguchi et al. |
| 6,256,020 B1 | 7/2001 | Pabon et al. |
| 6,259,423 B1 * | 7/2001 | Tokito et al. ............. 345/76 |
| 6,327,482 B1 | 12/2001 | Miyashita |
| 6,339,696 B1 | 1/2002 | Chan et al. |

* cited by examiner

VEHICLE-MOUNTED APPARATUS AND METHOD OF CONTROLLING THE SAME

The present Application is a Continuation Application of U.S. patent application Ser. No. 09/690,455, filed on Oct. 18, 2000 now U.S. Pat. No. 6,956,540.

BACKGROUND OF THE INVENTION

The present invention relates to an improved vehicle-mounted apparatus and the method of controlling the same. More specifically, the present invention relates to an improvement in operability of the vehicle-mounted apparatus.

Conventionally, a car audio player system, a car navigation system, or the combination thereof are known as equipment to be mounted on the moving body such as an automotive vehicle (herein after referred to as vehicle-mounted apparatus). The car audio player system is AV (audio visual) equipment also referred to as a car audio player for receiving radio or television, or for replaying music compact disks. The car navigation system guides the driver through the optimum path from the present location to the destination specified by the driver while calculating the present location by GPS or autonomous navigation, which is also referred to as a car navigation or car navigator.

This type of vehicle-mounted apparatus is attached on the dashboard of the automotive vehicle. However, since the space available in the interior of the car and the size of the vehicle-mounted apparatus are limited, the features such as a car navigator or a car audio player are formed in an apparatus and shares a single liquid crystal display and/or a single system loudspeaker so as to be switched between these two functions when used. More than one functions are allocated to the same operating switch for the respective features such as a car navigator and a car audio player.

The apparatus herein means a component that functions with organic integrity. For example, it includes the case where the GPS antenna unit and the CD automatic changer unit are separately installed on each section of the vehicle and interconnected by the signal cable.

In the vehicle-mounted apparatus described above, the contents shown on the display are switched depending on the user's selection. For example, when the car navigator is selected, a road map supplied by the car navigator is shown, and when the car audio player is selected, the display is changed into the animation display of the graphic equalizer supplied by the car audio player. Since the sound source of the audio player (hereinafter referred to as source) can be switched independently of the contents shown on the display, the user can listen to the radio while viewing a map screen of the car navigator.

Since the conventional vehicle-mounted apparatus has a single display for an apparatus, when two screens displays are required, a single display is subdivided into two screens. The function indications of the operation switches such as keys or the press buttons that have more than one functions are not differentiated by the states such as the car navigator in service, or the audio in service, but a plurality of functions are marked on the key or the location in the vicinity thereof. In addition, in conventional equipment, since the contents displayed on the screen is changed according to the function in service as described above, when the user wants to know the state of audio source while the display is showing the car navigator screen or the TV screen, the user has to access the specific screen first and then operate on that screen. Conventionally, the changeover of the sources has been made by key control, and the technique to change the source in synchronous with the operation of some mechanism, that is, a physical mechanism has not been known.

However, in the related art described above, there is a problem in that the operation is complicated because information from a plurality of systems has to be handled. In other words, since an apparatus has only a single display, in the case where the user wants to operate the audio while the car navigator screen is being displayed, the user has to switchover the screen every time, and thus the operating procedure becomes complicated.

In the prior art, since many keys have more than one function allocated, it is difficult to discriminate which action is allocated to which key among a plurality of keys, and thus the operation is difficult to understand. In the prior art, since the contents shown on the display is switched depending on the function in service, it is difficult to display information from a plurality of systems clearly because the state of audio is not known while the car navigator screen is being displayed.

In conventional equipment, though the operation of the physical mechanism such as adjustment of the angle of the panel display could be made, such a physical operation and the switchover of the source as described above are not linked. Therefore, the key operation for switching over the source and the physical operation of the panel have to be made separately, and thus improvement of the operability has been potentially expected.

With these problems of the related art in view, it is an object of the present invention to provide a vehicle-mounted apparatus that can handle information from more than one systems easily and the method of controlling the same. It is another object of the present invention to provide a vehicle-mounted apparatus that is easy to operate and the method of controlling the same.

SUMMARY OF THE INVENTION

In order to achieve the object described above, the first aspect of the present invention is a vehicle-mounted apparatus comprising a first panel including a first display, and a second panel including a second display, wherein the second panel is adapted to be opened and closed with respect to the first display about the side thereof as an axis.

The invention according to the first aspect comprises two displays such as a main display and a sub display, wherein the second display is connected to the first display with a hinge attached on the respective side edges so that the second display can be opened and closed as a cover, and two displays can display individual information so that the variety of uses are easily realized and the expected diversification of information to be displayed or improvement in the capabilities is easily accommodated.

The second aspect of the present invention is a vehicle-mounted apparatus according to the first aspect, wherein the second panel can be rotated upside down.

In the second aspect of the present invention, since the second display is rotatable upside down in addition to being capable of horizontal open/close movement, the available usage pattern increases. In other words, a state in which the second display covers the first display with the display surface faced toward the first display, a state in which the second display covers the first display with the back surface faced toward the first display, a state in which both displays are aligned with the display surfaces faced toward the user, and a state in which both displays are aligned with the back surfaces faced toward the user. In addition, by combining the slanted postures in the tracks of the sideway open/close movement or the upside down rotation, a variety of usage pattern are realized.

The third aspect of the present invention is a vehicle-mounted apparatus according to the first and second aspect, further comprising an operating switch, and means to change the function indication on the operating switch according to the predetermined conditions.

Considering the third aspect of the present invention to be a method, the eighth aspect of the present invention is a method of controlling the vehicle-mounted apparatus comprising a first panel having a first display, a second panel having a second display, and the second panel being adapted to be opened and closed with respect to the first display about the side edge thereof as an axis and to rotate upside down, further comprising a step of changing the function markings according to the predetermined conditions.

In the third and eighth aspect of the present invention, since the function of the operating switch, which changes in accordance with the states such as the car navigator mode or the car audio player mode, can be distinguished easily by the change in the function indication by turning ON/OFF the illumination or changing the color of the illumination, the operability of the vehicle-mounted apparatus is improved.

The fourth aspect of the present invention is a vehicle-mounted apparatus according to the second and third aspects of the present invention, further comprising means for rotating at least one of the operating switch and the function indication on the operating switch upside down when the second panel is rotated upside down.

In the fourth aspect of the present invention, since the operating switches and the function indications marked thereon are rotated upside down when the second display is rotated by 180 degrees upside down, the operating switch and the indications marked thereon are not inverted, but kept in the upright position, thereby facilitating the smooth discrimination of the operating switch and thus the operation itself.

The fifth aspect of the present invention is a vehicle-mounted apparatus according to any one of the second to the fourth aspects, further comprising an axis of rotation rotating relative to the upside down rotation of the second display, a first gear provided on the axis of rotation, a button provided on the opposite surface of the second panel from the second display, a second gear provided on the button, a slide plate with a rack for rotating the second gear according to the relative rotation of the first gear.

In the fifth aspect of the invention, the button can be rotated upside down simultaneously with the upside down rotation of the second display by a simple mechanism such as a gear and a rack, so that the indication on the button is shown in the normal orientation irrespective of the direction of the upside down rotation of the second display.

The sixth aspect of the invention is a vehicle-mounted apparatus according to any one of the first to the fifth aspects, further comprising means for displaying the current audio source on at least one of the first and second displays.

Considering the third aspect of the present invention to be a method, the ninth aspect of the present invention is a method of controlling the vehicle-mounted apparatus comprising a first panel having a first display, a second panel having a second display, and the second panel being adapted to be opened and closed with respect to the first display about the side edge thereof as an axis and to rotate upside down, further comprising a step of displaying the current audio source on at least one of the first and second displays.

In the sixth and ninth aspect of the invention, the current audio source is shown on any one of the displays. For example, by displaying the state of the source currently selected or connected on the second display, the use can check the audio source even when the car navigator screen or the TV screen is shown on the first display.

The seventh aspect of the invention is a vehicle-mounted apparatus according to any one of the second aspect to the sixth aspect, further comprising means for detecting the action of the second panel by a predetermined angle in terms of at least one of the open/close actions and the rotation, and means for switching the source when the detection has made.

Considering the tenth aspect of the invention to be a method, the tenth aspect of the invention is a method of controlling the vehicle-mounted apparatus comprising a first panel having a first display, a second panel having a second display, and the second panel being adapted to be opened and closed with respect to the first display about the side edge thereof as an axis and to rotate upside down, further comprising a step of detecting the action of the second panel by a predetermined angle in terms of at least one of the open/close actions and the rotation, and switching the source when the detection has made.

In the seventh and the tenth aspects, since the source is switched by the action to open/close or to rotate the second display, the operability is improved.

DETAILED DESCRIPTION OF THE PREFERRED EMBODIMENTS

Referring now to the drawings, an embodiment of the present invention will be described in detail. The parts of the related art, which are identical to the present invention, can be used as well, and the members identical to those in the previous drawings are designated by the identical numerals, and the descriptions thereof are omitted.

Though the controlling section included in this embodiment can be implemented by controlling the computer with software, the present invention will be described using a virtual circuit block that implements each function since various Mode of implementation is possible depending on the range or the form of software processing.

[1. Structure]

This embodiment is a vehicle-mounted apparatus that can be mounted on the dashboard of the automotive vehicle and used for displaying information on the functions of the car navigator and the car audio player and for controlling the same. The CD auto changer unit, the GPS antenna unit, the FM diversity antenna unit, the vehicle mounted loudspeaker system unit, or the like are to be mounted on other locations in the vehicle and connected to the vehicle mounted apparatus by the analogue of digital signal lines.

[1-1. General Structure]

Figure 1:
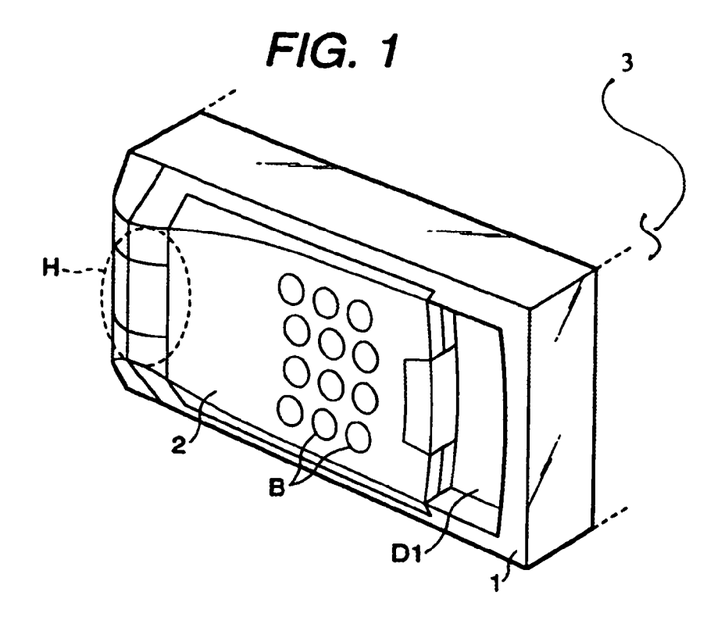
FIG. 1 is a perspective view showing a state (Storage Mode) of the vehicle-mounted apparatus according to an embodiment of the present invention.
Figure 2:
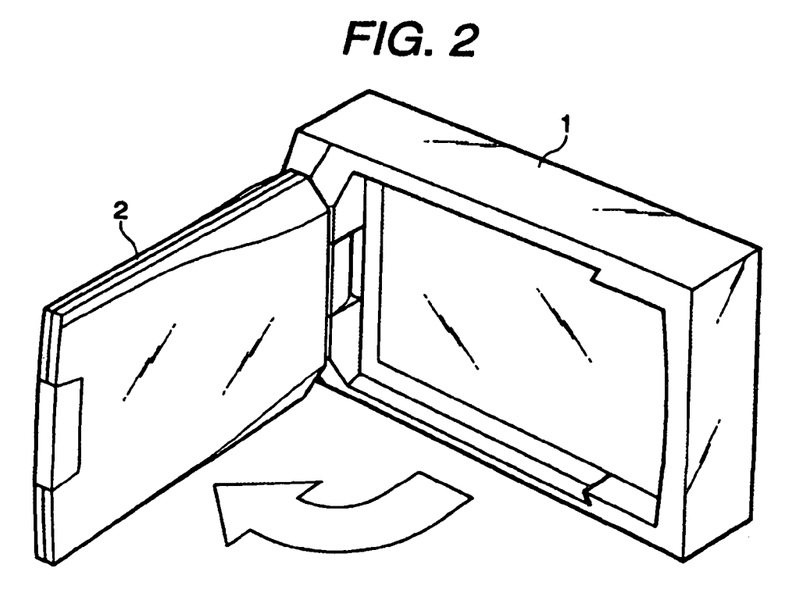
FIG. 2 is a perspective view showing a state in which the sub panel is opened from the state shown in FIG. 1 according to an embodiment of the present invention.
Figure 8:
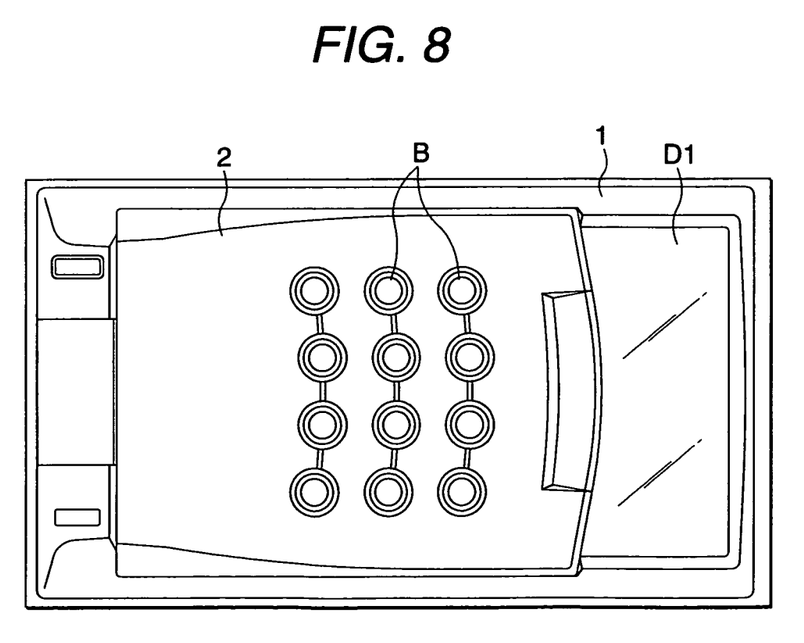
FIG. 8 is a front view of the vehicle-mounted apparatus according to an embodiment of the present invention showing a state (the Storage Mode) corresponding to the state shown in FIG. 1.

The vehicle-mounted apparatus according to this embodiment is a box-shaped apparatus having a controlling section for controlling each unit described above, and a main panel 1 mounted vertically on the front surface facing toward the user is shown in FIG. 1, as exemplarily mounted on vehicle dashboard 3. FIG. 8 is a front view of the main panel 1. As shown in these figures, this embodiment comprises a main display (corresponding to the first display) D1 provided in the main panel 1 and a sub panel 2 mounted on the main panel.

The sub panel 2 is fixed on the main panel 1 via a hinged portion H provided in the vicinity of the left end of the main panel 1, and opened/closed and rotated upside down with respect to the main display D1.

In other words, the hinged portion H serves as a fulcrum of the swinging movement in the horizontal directions when the sub panel is opened or closed as shown in FIGS. 1 to 3, and FIGS. 5 to 7. The sub panel 2 is dimensioned so that it can cover approx. ¾ of the main display D from the left end (FIG. 1, FIG. 8) with the sub panel 2 closed with respect to the main display D1, and provided with a plurality of push buttons B which serve as operating switches on one of the surfaces, which is referred to as a back side in this embodiment. The main panel 1 is also provided with other operating switches as needed, and the button B and other operating switches are designated as SW1.

Figure 3:
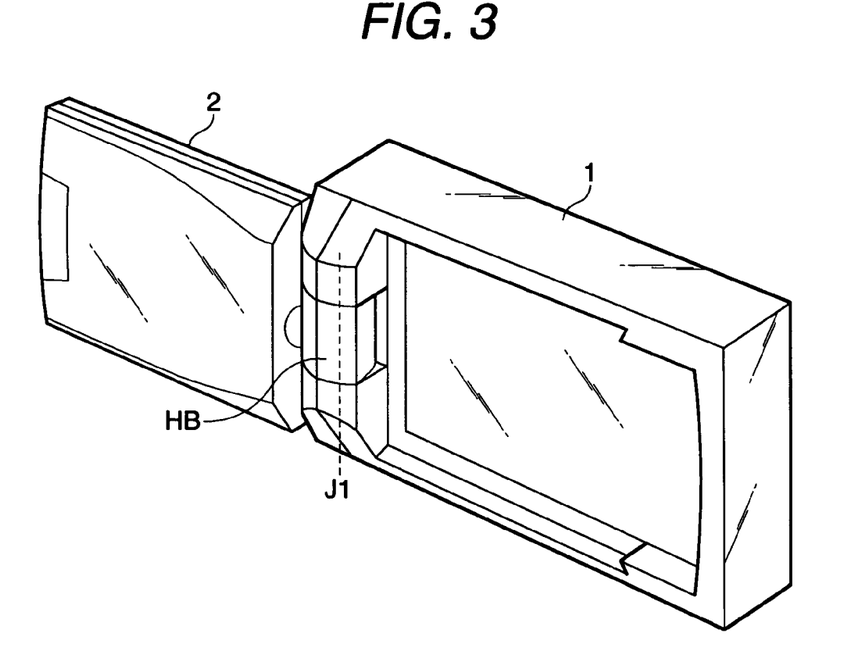
FIG. 3 is a perspective view of a vehicle-mounted apparatus showing a state (Dual Display Mode) following the state in FIG. 2 according to an embodiment of the present invention.
Figure 9:
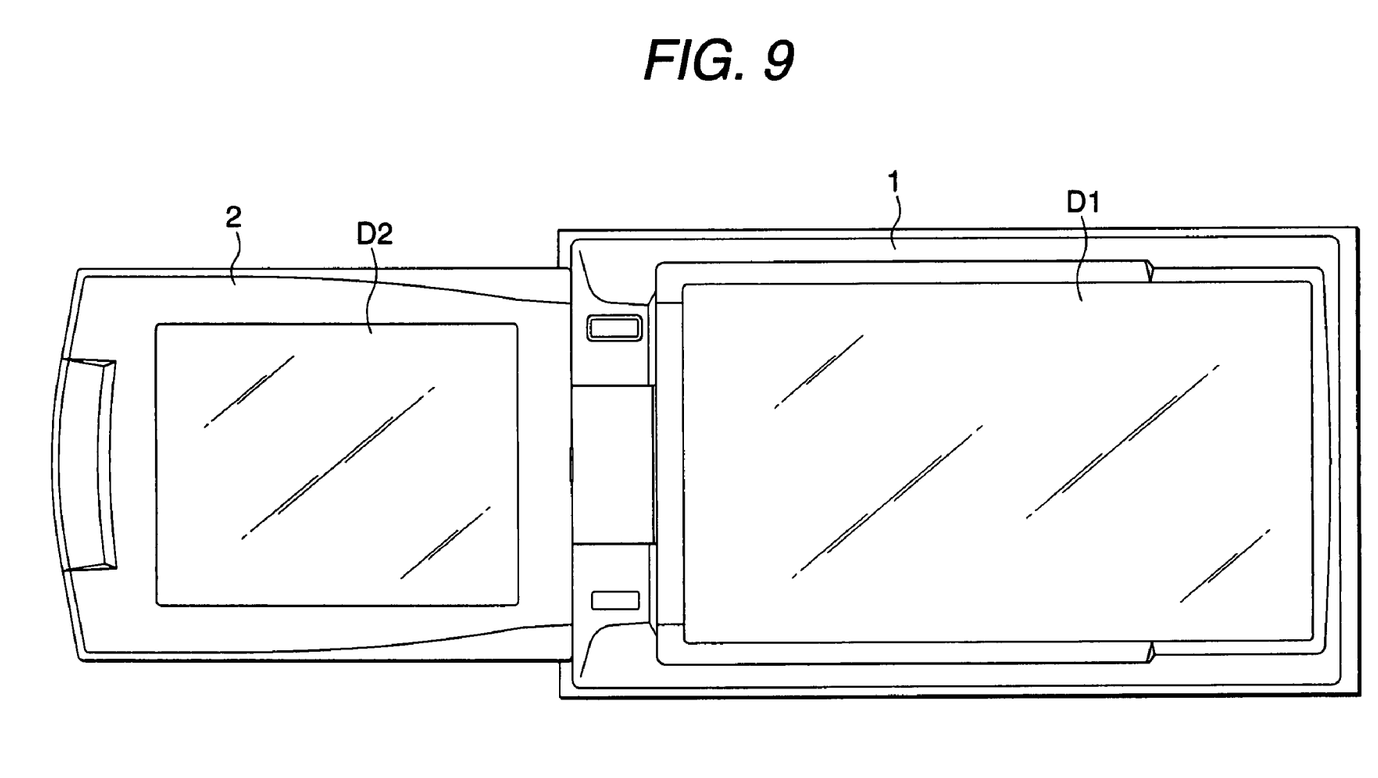
FIG. 9 is a front view of the vehicle-mounted apparatus according to an embodiment of the present invention showing a state (Dual Display Mode) corresponding to the state shown in FIG. 3.

FIG. 9 is a front view showing a state in which the sub panel 2 is opened with respect to the main panel 1, and corresponds to the state shown in FIG. 3. In other words, on the opposite surface of the sub panel 2 from the back side is provided with a sub display D2 (corresponds to the second display), which is referred to as the front surface here. In FIGS. 1 to 7, the sub display D2 is not shown.

[1-2. Structure of the Hinged Portion]

The hinged portion H connecting the main panel 1 and the sub panel 2 is provided with a first journal J1 (FIG. 3) for opening and closing the sub panel 2 with respect to the main panel 1 as is described above and a second journal J2 (FIG. 4) for rotating the sub panel 2 upside down. More specifically, the hinged portion H rotates the hinge base HB in the horizontal directions with respect to the vertical first journal J1 along the left end of the main panel 1, and rotates the sub panel 2 upside down about the second journal J2 which is horizontally extending from the hinge base though the sub panel 2.

Figure 4:
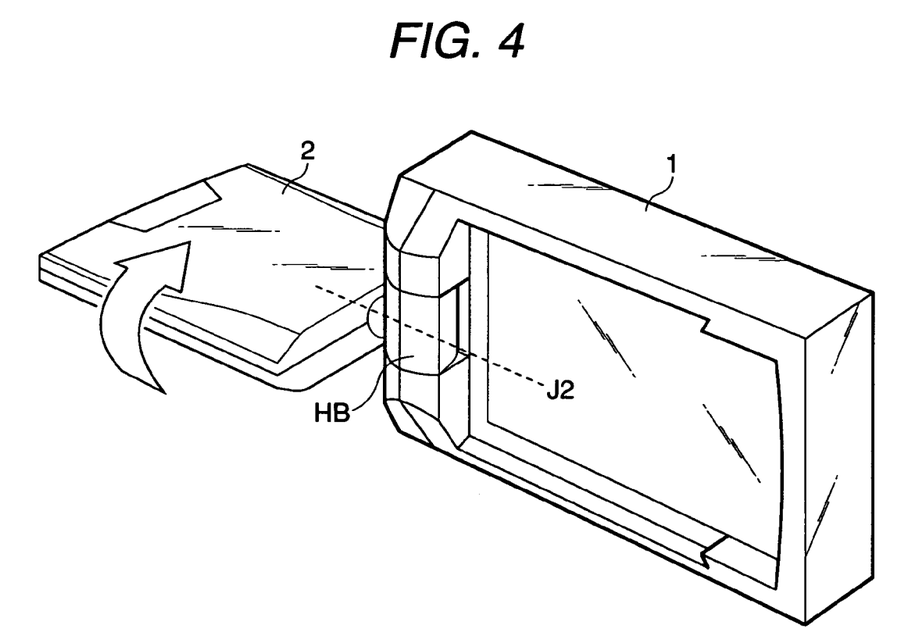
FIG. 4 is a perspective view of the vehicle-mounted apparatus showing a state in which the sub panel is being rotated upside down from the state shown in FIG. 3 according to an embodiment of the present invention.
Figure 10:
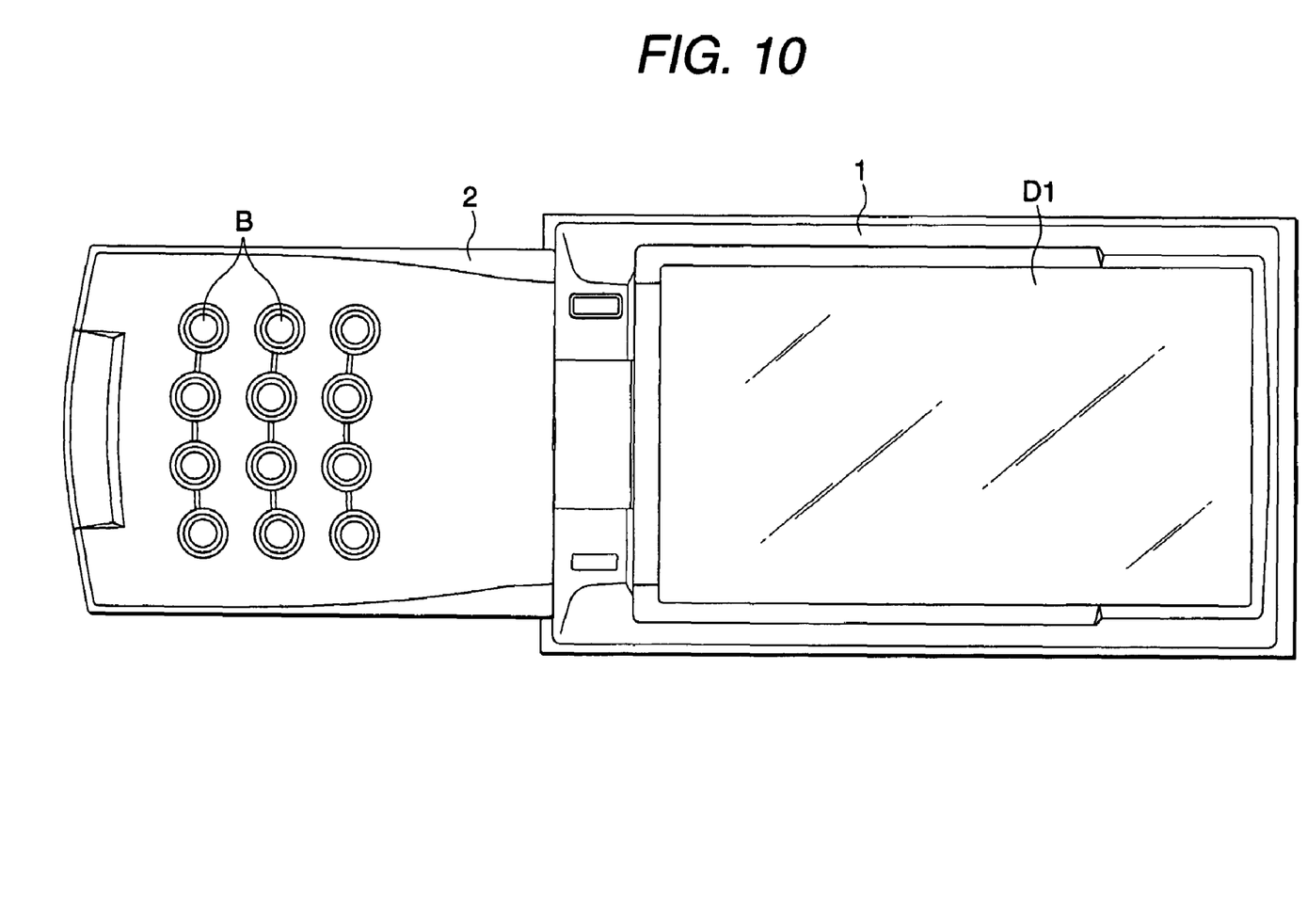
FIG. 10 is a front view of the vehicle-mounted apparatus according to an embodiment of the present invention showing a state (Formation Key Mode) corresponding to the state shown in FIG. 5.
Figure 11:
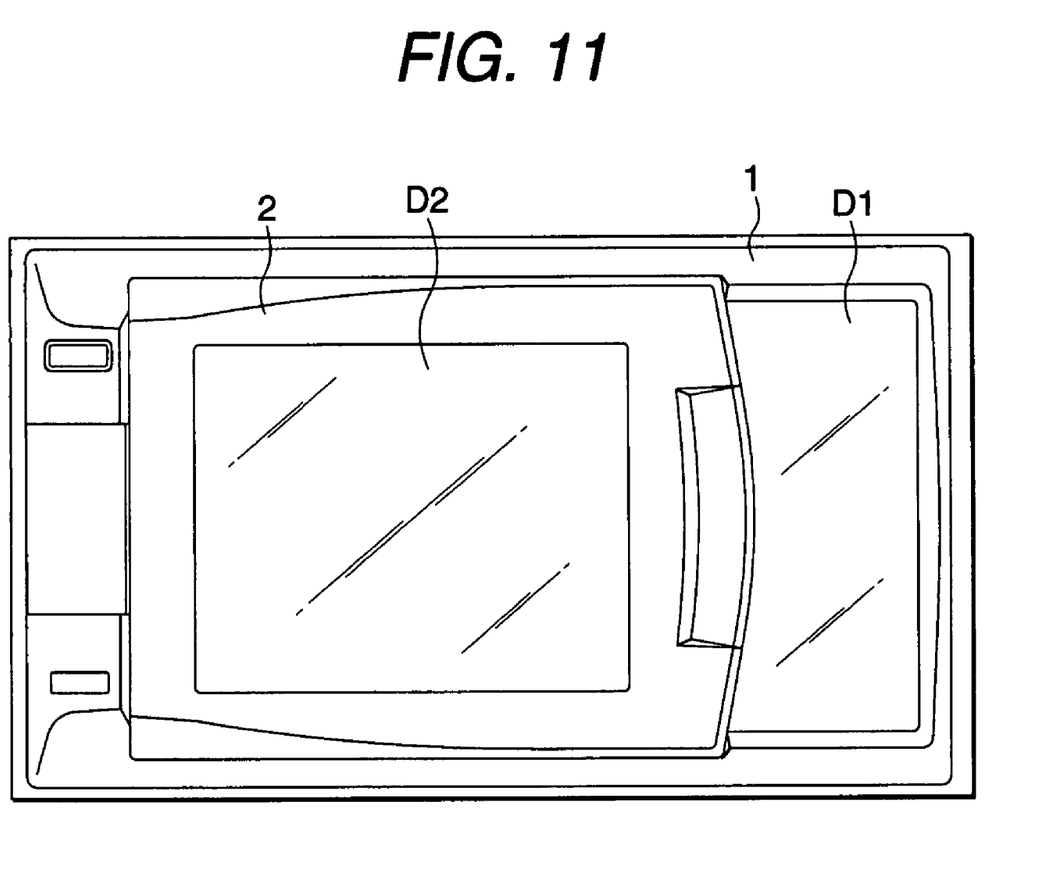
FIG. 11 is a front view of the vehicle-mounted apparatus according to an embodiment of the present invention showing a state (Over Display Mode) corresponding to the state shown in FIG. 7.

The hinged portion H of such a dual structure enables the sub panel 2 to rotate upside down by 180°, that is, to turn front side back with the sub panel 2 being opened, as shown in FIG. 4. FIG. 10 is a front view showing a state in which the sub panel 2 is rotated upside down from the state shown in FIG. 3 and FIG. 9 into the state shown in FIG. 4, which corresponds to the state shown in FIG. 5. FIG. 11 is a front view showing a state in which the sub panel 2 is closed from the state shown in FIG. 5 into the state shown in FIG. 6, which corresponds to the state shown in FIG. 7.

The hinged portion H comprises a clicking mechanism and two detecting switches. The clicking mechanism is a mechanism for stabilizing the sub panel 2 at prescribed angles (referred to as click positions) within the range in which the sub panel 2 can be rotated along each journal by applying a constant stopping force to the rotation in any directions. The hinged portion H has braking torque that absorbs an external force such as vibration or inclination when mounted on the vehicle at any angles. The mechanism can be implemented by the conventional known technique.

The detecting switches are a rotational angle end detecting switch and an open/close switch, which are generally referred to as the detecting switch SW2. The rotational angle end detecting switch is a detecting switch for detecting that the sub panel 2 reaches the end of the angle range of the upside down rotation of the sub panel 2. The open/close switch is a detecting switch for switching the function of the operation switches including the button B and controlling the switching operation of the screen images to be projected on the main display D1.

[1-3. Construction in the Sub Panel]

The sub panel is constructed as follows for changing the function indication marked on the button B by marking or printing according to the predetermined conditions. The function indication may be changed by marking the function on the button or the location in the vicinity thereof by the liquid crystal display or the transmitted light of the illumination in advance, and switching the liquid crystal display or the illumination. However, in this embodiment, the button B itself is rotated upside down when the sub panel 2 having a sub display D2 is rotated upside down.

Figure 12A:
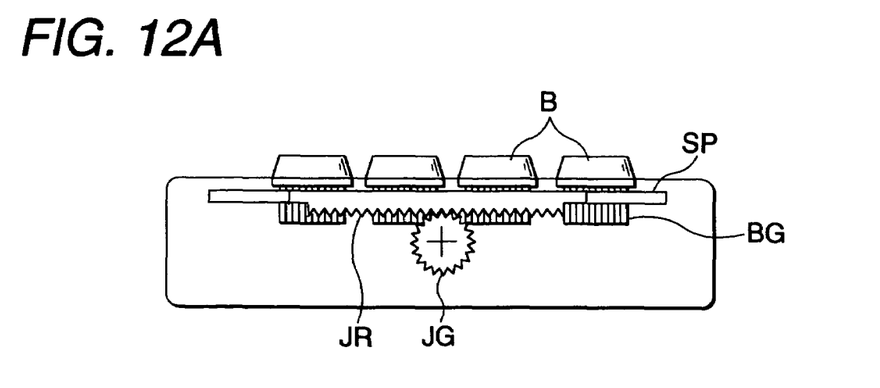
FIGS. 12A and 12B are drawings showing a mechanism within the sub panel of the vehicle-mounted apparatus according to an embodiment of the present invention.
Figure 12B:
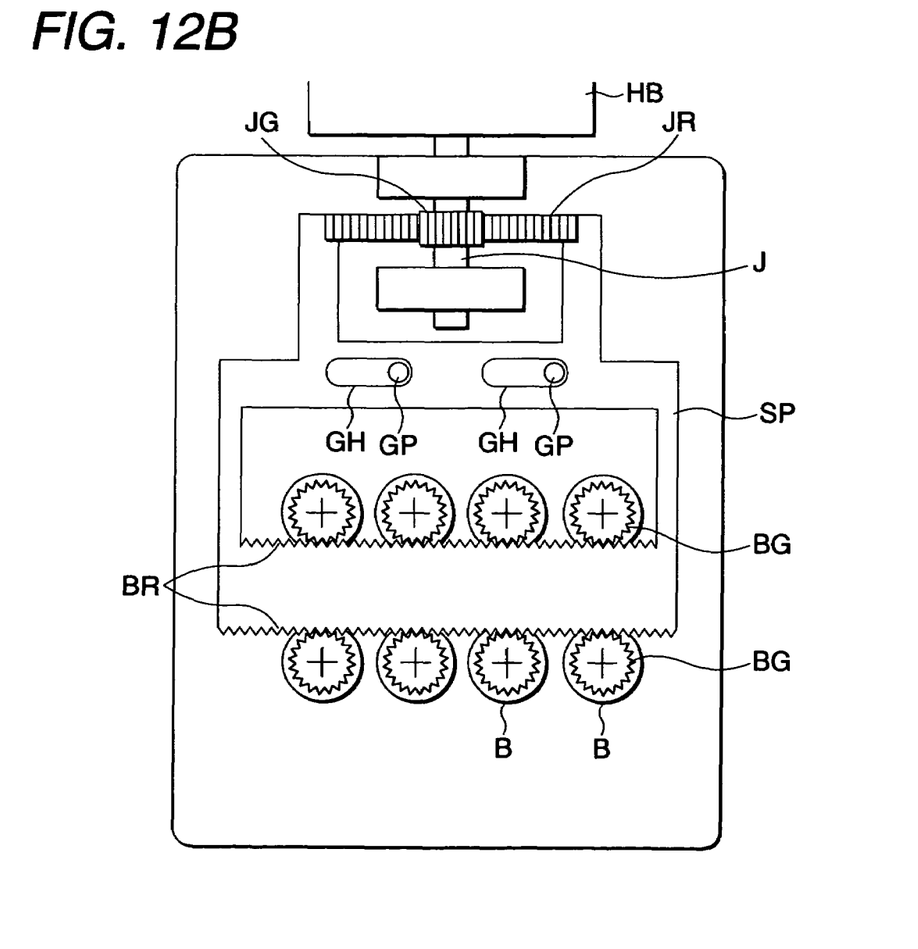

In other words, FIGS. 12A and 12B are drawings showing the structure of the sub panel 2. FIG. 12A is a drawing of the inside of the sub panel 2 viewed from the side of the hinge base HB, and FIG. 12B is a drawing of the inside of the sub panel 2 from the side of the sub display D2.

In other words, since the journal for upside down rotation J formed integrally with the hinge base HB extends in the sub panel 2, when viewed from the sub panel 2. The journal for the upside down rotation J is provided with a first gear JG integrally formed by resin integral molding. On the other hand, the base portion of each button B provided on the operating surface of the sub panel 2 is provided with a second gear BG formed by resin integral molding.

In the sub panel 2, there is provided a slide plate SP with a rack. The slide plate SP rotates each second gear BG provided on each button B according to the relative rotation of the first gear JG provided on the journal for upside down rotation, and slides in the direction of the width of the sub panel, that is, at right angles with respect to the journal J.

More specifically, the slide plate SP is formed with two guide holes GH in parallel with the direction of the sliding movement, and two guide pins GP formed on the inner side of the case of the sub panel 2 pass through each guide hole GH so as to slide freely. Slide plate SP is formed with a journal rack JR and the button rack BR, each of which is engaged with the first gear JG provide on the journal for the upside down rotation and the second gear BG formed on each button B.

[1-4. Construction of the Controlling Section]

Figure 13:
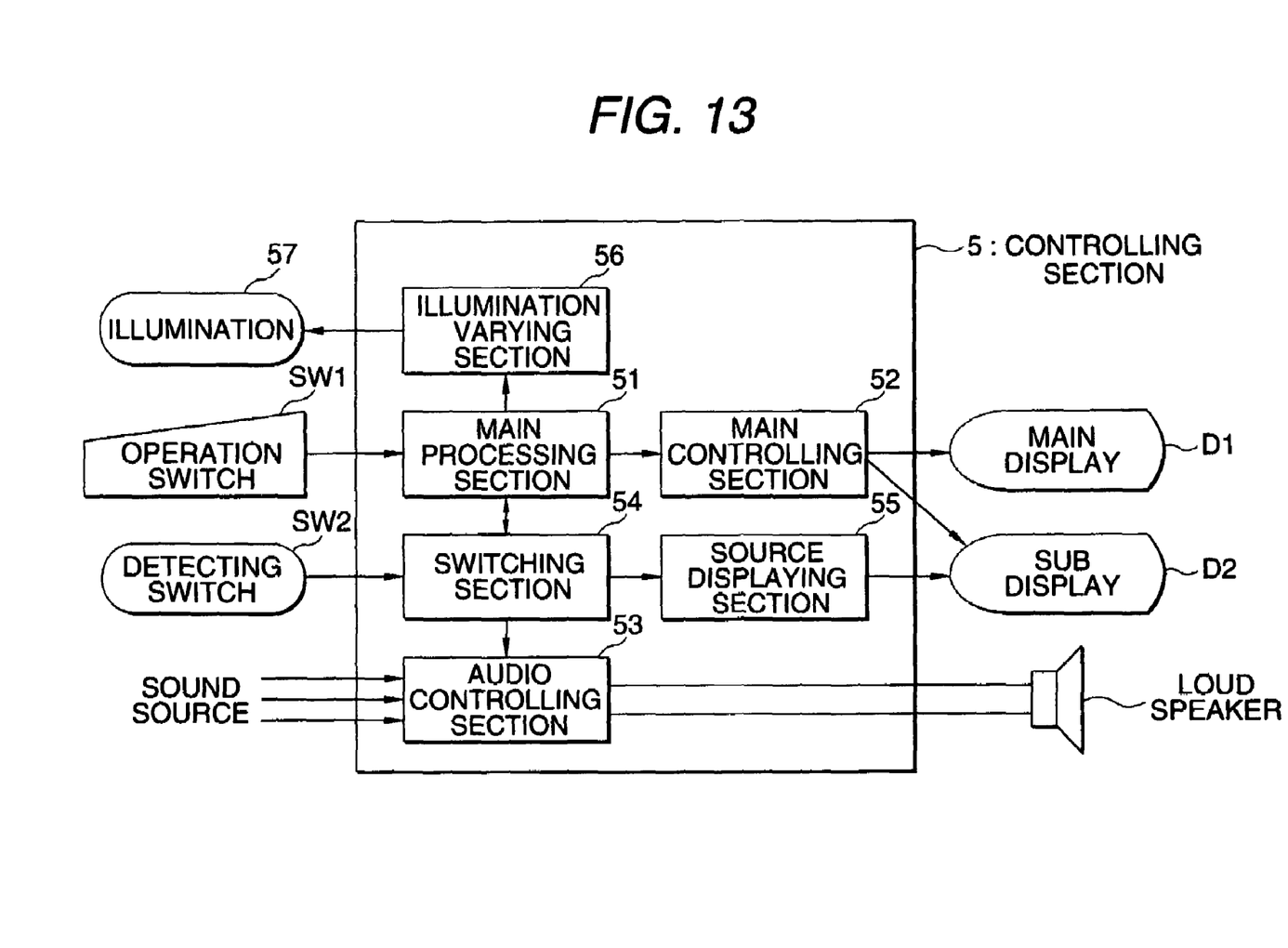
FIG. 13 is a functional block diagram showing the structure of the controlling section of the vehicle-mounted apparatus according to an embodiment of the present invention.

This embodiment includes a controlling section using a computer, and as shown in a functional block diagram of FIG. 13, the controlling section 5 comprises a main processing section 51, a main display section 52, an audio controlling section 53, a switching section 54, a source display section 55, and an illumination varying section 56.

The main processing section 51 is a section for processing information on the car navigator or the car audio player based on the input from the operating switch SW1 including the button B, and the main display section 52 is a section for displaying various information on the main display D1 or the sub display D2 according to the result of the information processing. The audio controlling section 53 is a section for controlling the audio player, such as a selection of the input system or an adjustment of the sound quality by DSP.

The switching section 54 is means for detecting the predetermined angular movement of the sub panel 2 at least for one of open/close action or the rotation via the detecting switch SW2 and switching the audio source when such a movement is detected. The source displaying section 55 is means for displaying the current audio source on the sub display D2.

The illumination varying section 56 is means for varying the function indication of the operating switch SW1 such as the button B according to the predetermined conditions. More specifically, it controls the illumination 57 such as a LED illumination based on the state of the detecting switch SW2.

[2. Operation]

The embodiment as described thus far is operated as follows.

[2-1. Storage Mode]

As shown in FIG. 1 and FIG. 8, a state in which the sub panel 2 is closed on the main panel 1 with the button B on the sub panel 2 facing toward the user is referred to as Storage Mode. In such a Storage Mode, the button B on the back surface of the sub panel serves as an audio operating key, and enables the control of the function of the car audio player such as the selection of the radio station or an adjustment of the sound quality by the action of the main processing section 51 and the audio controlling section 53.

In this Storage Mode, the user can view a part of the main display D on the right side of the sub panel 2, in other words, the right part of the main display D1 (FIG. 8), on which the state of the source of the audio player, that is, the station, the name of the station, and the frequency being received via the radio, or the track No., the elapsed time being played by the CD or the MD may be displayed in reduced sizes.

[2-2. Dual Display Mode]

When the sub panel 2 is opened from the Storage Mode shown in FIG. 1 (FIG. 2), the main display D1 and the sub display D2 are aligned side by side (FIG. 9, FIG. 3). This state is referred to as Dual Display Mode, in which the car navigator screen, the TV screen, or the audio control screen is shown on the main display 1, while other information such as a simplified map for the car navigator, a screen or the audio control may be shown in a small screen on the sub display D2.

Even when the sub panel 2 is opened, since the rotational angle that defines the angle of the sub panel 2 may be freely controlled by the action of the hinged portion H or the brake torque, the user can easily set the sub panel 2 to the position and angle in which the user can easily view the image on the display, and the angle of the sub panel 2 cannot be changed easily due to vibrations or inclination that may be caused by driving of the vehicle.

[2-3. Formation Key Mode]

Figure 5:
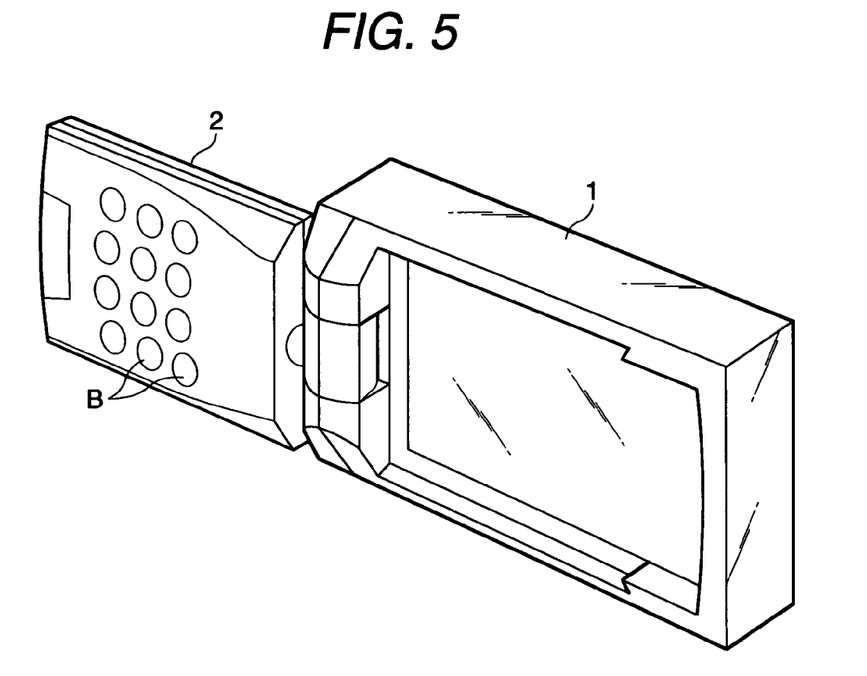
FIG. 5 is a perspective view of the vehicle-mounted apparatus showing a state (Formation Key Mode) following the state in FIG. 4 according to an embodiment of the present invention.
Figure 6:
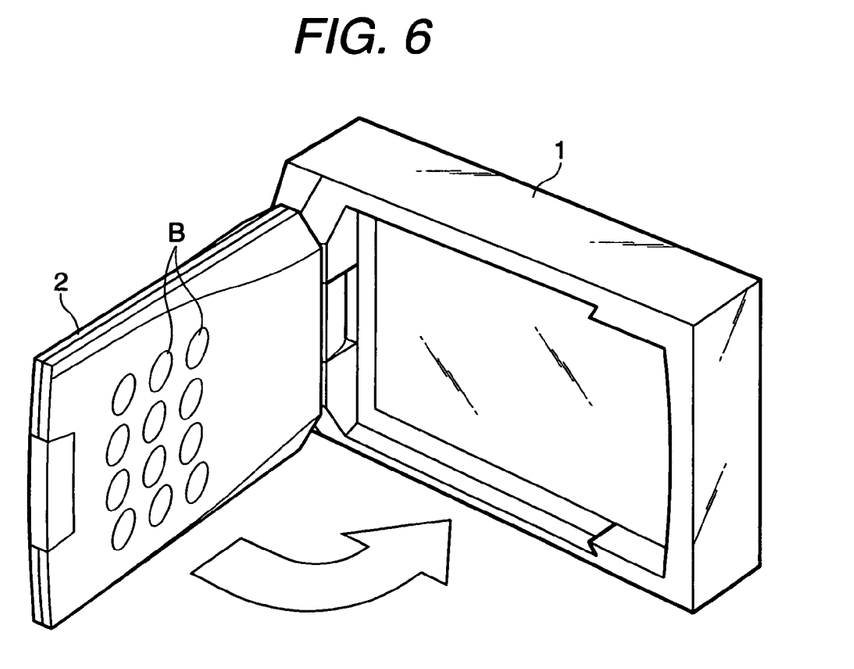
FIG. 6 is a perspective view of the vehicle-mounted apparatus showing a state in which the sub panel is being closed from the state shown in FIG. 5 according to an embodiment of the present invention.

When the sub panel 2 is further rotated upside down from Dual Display Mode of FIG. 3 (FIG. 4), the button B is aligned on the left side of the main display D1 (FIG. 5, FIG. 10). This state is referred to as Formation Key Mode.

When the sub panel 2 is rotated upside down, in the sub panel 2 (FIGS. 12A and 12B), the journal for upside down rotation J integral with the hinge base HB rotates with respect to the sub panel 2. This rotating force makes the slide plate SP slide via the first gear JG and the axis rack JR, and the sliding force in turn rotates the button B by the button rack BR and the second gear BJ of each button B.

Consequently, when the sub panel 2 is rotated upside down by 180°, each button B rotates upside down by 180° as well, and thus the marking of the function on the button will never be inversed. Therefore, the marking on each button is always oriented in the normal direction irrespective of whether the sub panel 2 is reversed or not.

In Formation Key Mode as shown in FIG. 5, and FIG. 10, the main display D1 displays the audio control screen, the car navigator screen, the TV screen by the action of the main controlling section 51. The sub panel 2 may show the function of each button corresponding to the display on the main display D1 by varying the illumination 57 of the LED illumination by the action of the illumination varying section 56 so as to enable the mode control.

[2-4. Over Display Mode]

Figure 7:
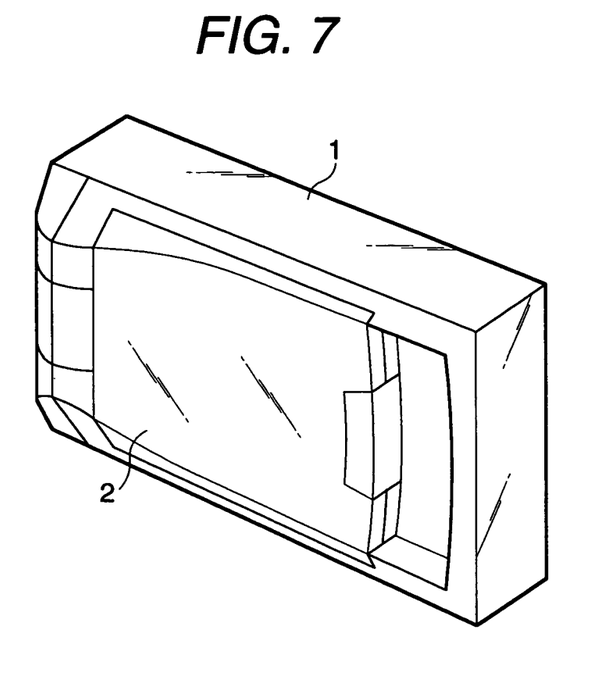
FIG. 7 is a perspective view of the vehicle-mounted apparatus showing a state (Over Display Mode) following the state shown in FIG. 6 according to an embodiment of the present invention.

When the sub panel 2 is closed (FIG. 6) from Formation Key Mode shown in FIG. 5 and FIG. 10, the sub display D2 is overlapped on the main display D1 and thus the use can view a part, that is, the right portion of the main display D1, in addition to the sub display D2 (FIG. 7, FIG. 11). This state is referred to as Over Display Mode.

In this state of over display, for example, it is possible that the sub display D2 show a simplified map of the car navigator and the main display D1 shows the operating panel for various functions, or as the Storage Mode shown in FIG. 1 and FIG. 8, it is also possible that the portion of the main display D1 exposed on the right side of the sub panel 2 show the state of the audio source by the action of the source display section 55 in a reduced size.

[2-5. Switchover of the Screen and the Source]

The contents displayed on the main display D1 and the sub display D2 for each state described above are controlled by the clicking mechanism, the detecting switch, the main processing section 51, the main display section 52, and the source display section 55. In this case, the kind of movement or the position of the sub panel 2 to be detected, the type of the detecting switch to be used, or how to detect them in terms of the open/close movement and the upside down rotation, and the contents to be displayed are determined freely by the user. Considering the states as described above, there is shown an example.

The position where the sub panel 2 is closed on the main display D1 (FIG. 1, FIG. 7) is designated to be zero degree as a clicking position, and the position where the sub panel 2 is opened (FIG. 3, FIG. 5) is designated to be 180 degrees. In this case, the detecting switch SW2 detects that the sub panel 2 reaches these clicking positions of zero degree and 180 degrees, and when it is at the position of zero degree, the main display D1 shows information on the state of the audio source in the form of a small screen in the exposed portion on the right side. This corresponds to the Storage Mode (FIG. 1) and Over Display Mode (FIG. 7).

On the other hand, at the position of 180 degrees, each push button B is used as a mode key for switching the Mode of operation to control the contents displayed on the screen corresponding to the selected mode, which is Formation Key Mode (FIG. 5).

By the action of the switching section 54, the open/close movement or the upside down rotation of the sub panel 2 is detected by the detecting switch SW2 when the sub panel 2 reaches to the predetermined angles (FIG. 13), and when detected, the audio source is switched according to the predetermined conditions and the priority.

[3. Effect]

As described thus far, in this embodiment, various uses are possible such that different information are shown on the two different displays D1 and D2 by the open/close movement of the sub display 2 from/on the main display by the hinge H on the side of these displays, thereby being adaptable to the diversification of displayed contents and the improvement of the functions, which are expected in the future.

In this embodiment, since the sub display D2 rotates upside down in addition to the horizontal open/close movement, the possible state of use increases. In other words, the state of the second display with respect to the main display D1 which is facing toward the user can be changed among the state in which the second display covers the main display D1 with the display side facing toward the user (FIG. 11), the state in which the second display covers the main display with the back side facing toward the user (FIG. 8), the state in which the second display is aligned with the main display D1 side by side with the display side facing toward the user (FIG. 9), and the state in which the second display is aligned with the main display D1 with the back side facing toward the user (FIG. 10). By combining the state being inclined and stopped half way of the open/close movement or the upside down rotation, very diversified states of use is realized.

In this embodiment, since the functions of the operating switch which changes according to the states such as the car navigator mode or the car audio player mode are easily identified by changing the marking of the function by ON/OFF of the illumination or by changing the color of illumination by the action of the illumination varying section 56, the operability of the vehicle-mounted apparatus is improved.

In this embodiment having the structure shown in FIGS. 12A and 12B, when the sub display D2 is rotated upside down by 180°, the marking of the function on each button B is rotated as well so that the marking is not inversed but shown in the normal orientation, whereby the function of each button B can be easily identified and the operability is improved. Especially, in this embodiment, this function can be realized by a simple mechanism of gears and racks shown in FIGS. 12A and 12B.

In this embodiment, by displaying the state of the source currently selected/connected on one of the main display D1 and the sub display7 D2 by the action of the source display section 55, the audio source can be checked even when the car navigation screen or the TV screen is being displayed. By displaying the state of the source currently selected/connected on the sub display D2, the audio source can be checked even when the car navigator screen or the TV screen are being displayed on the main display D1.

In this embodiment, the source is switched by the close/open movement or the rotation of the sub display D2 by the action of the detecting switches SW2 and the switching section 54, the operability is improved.

[4. Other Embodiments]

The present invention is not limited to the embodiment described above, but it may include other embodiments shown below. For example, the present invention may be applied not only to the automotive vehicle, but also to the vehicle-mounted apparatus to be mounted on other mobile bodies such as the motorbike. The hinge H is located on the left side of the main panel 1 in the embodiment described thus far, the hinged portion H may be on the right side of the main panel 1.

The size of the sub panel may be freely determined. For example, it may be the size that covers whole part of the main display D1 when closed as a theft-prevention measure. It is also possible to combine the present invention with the functions other than the car navigation or the car audio player.

The upside down rotation of the sub panel 2, change in marking of the function according to the prescribed conditions, the upside down rotation of the button corresponding to the upside down rotation of the sub panel 2, the display of the audio source, switchover of the audio source by the operation of the sub panel 2 are not mandatory, but any combinations thereof are possible.

It is also possible to rotate only the part of the marking, but not the whole part of the button. The upside down rotation of the marking of the function does not have to be made by the mechanical mechanism, but may be realized by rotating the contents shown in the liquid crystal display by 180°. The mechanism to rotate the button in accordance with the upside down rotation of the sub panel 2 may be implemented not by the rack shown in FIGS. 12A and 12B, but by other mechanisms such as a crank mechanism.

As is described thus far, according to the present invention, since a vehicle-mounted apparatus that can handle information from a plurality of systems easily and the method of controlling the same are presented, the vehicle-mounted apparatus can be used more conveniently.

What is claimed is:

1. A vehicle-mounted apparatus, comprising:
   a first panel including a first display, said first panel being substantially directly mountable onto a surface of a vehicle; and
   a second panel including a second display, said second panel being openable and closeable with respect to said first display about a side thereof as a first axis, wherein said second panel is rotatable upside down in an axis perpendicular to said first axis.

2. The vehicle-mounted apparatus of claim 1, further comprising:
   an operating switch; and
   means for rotating upside down at least one of said operating switch and a function indication on said operating switch when said second panel is rotated upside down.

3. The vehicle-mounted apparatus of claim 1, further comprising:
   an operating switch; and
   means for changing a function indication on said operating switch according to whether said second panel is rotated upside down.

4. The vehicle-mounted apparatus according to claim 1, further comprising:
   means for detecting a position of said second panel by a predetermined angle in terms of at least one of the open/close actions and the rotation; and
   means for switching an input source upon said detecting.

5. The vehicle-mounted apparatus as set forth in claim 1, further comprising:
   means for displaying a current audio source on at least one of said first and second displays.

6. A method of controlling a vehicle-mounted apparatus comprising a first panel having a first display and a second panel having a second display, said method comprising:
   adapting said second panel to be opened and closed with respect to said first display about an edge thereof as a first axis and to rotate thereof upside down in an axis of rotation that is perpendicular to said first axis; and
   changing a function indication according to at least one of whether said second panel is open/closed and whether said panel is rotated.

7. A method of controlling the vehicle-mounted apparatus comprising a first panel having a first display and a second panel having a second display, said method comprising;
   adapting said second panel to be opened and closed with respect to said first display about an edge thereof as a first axis and to rotate thereof upside down in an axis of rotation that is perpendicular to said first axis; and
   displaying a current audio source on at least one of said first and second displays.

8. A method of controlling a vehicle-mounted apparatus comprising a first panel having a first display and a second panel having a second display, said second panel being adapted to be opened and closed with respect to said first display about an edge thereof as a first axis and to rotate upside down about an axis of rotation that is perpendicular to said first axis, said method comprising:
   detecting a position of said second panel at a predetermined angle in terms of at least one of the open/close actions and the rotation; and
   switching an input source upon said detecting.

9. A display device, comprising:
   a first panel including a first display, said first panel being substantially directly mountable on a surface;
   a second panel including a second display, said second panel openable and closeable with respect to said first panel about a first axis located at an edge of said first panel; and
   a pivoting mechanism to allow said second panel to be turned upside down in a rotation axis that is perpendicular to said first axis.

* * * * *